United States Patent Office 3,499,019
Patented Mar. 3, 1970

3,499,019
PROCESS FOR THE PRODUCTION OF WATER INSOLUBLE ZINC MERCAPTIDES
Henryk Szulc, Wroclaw, and Zdzislaw Michalski and Marian Piotrowski, Zarow, and Zygmunt Kosmala and Wladyslaw Jedrzejewski, Swidnica, Poland
No Drawing. Filed July 10, 1967, Ser. No. 652,011
Claims priority, application Poland, July 11, 1966, P 115,546
Int. Cl. C07f 3/06
U.S. Cl. 260—429.9          7 Claims

ABSTRACT OF THE DISCLOSURE

A process for producing accelerators for the vulcanization of rubber which uses as a starting material, a resinous byproduct which is formed in the production of 2-mercaptobenzothiazole.

The resinous material is treated with aqueous alkali hydroxide to convert the resinous matter into water soluble alkali mercaptides which are separated from the resinous matter and precipitated out as an insoluble heavy metal salt such as the zinc salt by means of a heavy metal salt such as zinc sulfate.

BACKGROUND OF THE INVENTION

This invention relates to vulcanizing accelerators and more particularly to a process for producing same from materials hitherto considered as industrial wastes. This previously considered waste material is a resinous impurity which is obtained in the production of 2-mercaptobenzothiazole, for example, according to the processes disclosed in U.S. Patent Nos. 1,631,871; 2,631,153 and 3,031,073.

SUMMARY OF THE INVENTION

The present invention provides a new and unexpected use for the resinous waste material formed in the production of 2-mercaptobenzothiazole. According to the invention, the resinous waste material is heated and stirred with an aqueous alkali hydroxide preferably sodium hydroxide, or ammonium hydroxide to form, in a preferred embodiment, soluble sodium mercaptides of the compounds contained in the resinous starting material. The formed mercaptides are then separated from the unreacted material and converted to insoluble zinc mercaptides by treating same with aqueous zinc sulfate at a pH of about 5.5 to 6.7.

In detail, the invention relates to a process for preparing vulcanizing accelerators from the industrial waste material obtained in the production of 2-mercaptobenzothiazole by way of a pressure process.

As a result of a known pressure process for the production of 2-mercaptobenzothiazole, which process involves the reaction of aniline, carbon disulfide and sulfur or aniline, nitrobenzene, carbon disulfide and sulfur, there is produced a raw product containing about 85–92% of the desired 2-mercaptobenzothiazole and about 8–15% of resinous impurities.

According to the known processes, purification of said raw product is performed by crystallization from a solvent such as naphtha, in which the resinous impurities are dissolved or by separating the resins from an alkaline solution wherein their reactivity toward oxidation is utilized. The resinous impurities separated from the raw product are in the form of a viscous mass. Heretofore, these impurities were removed as a useless waste and discarded.

The present inventor has now found a hitherto unknown use for these resinous impurities.

According to the present invention, the resinous impurities or the resinous impurities dissolved in a solvent are treated with an aqueous solution of an alkali-metal hydroxide, such as sodium or potassium hydroxide, or ammonium hydroxide. Preferably, sodium hydroxide of about 25% NaOH concentration is used.

The reaction mixture is stirred until the material in the waste resin is completely reacted with the alkali hydroxide. The alkali-metal salts, preferably, the sodium salt of these compounds are formed, and being soluble in water pass into the aqueous phase. In order to accelerate the process, as well as to transform the insoluble compounds (structurally containing —SS— bonds) into soluble alkali-metal mercaptides, the reaction medium is heated to a temperature of about 70° C. and is stirred at that temperature for about 60 minutes.

Then, the reaction mixture is mixed with about four volumes of water, after which the entire mass is stirred for about 0.5 hr. at about 50° C.

After this operation, the entire mixture is poured into a settler in which the aqueous solution of alkali-metal mercaptides is separated from the remaining unreacted resinous mass collected at the bottom of the settler. The separation of the aqueous solution of mercaptides from the resinous mass may be performed by means of other apparatus or devices accommodated to this kind of operation. It is preferable to effect the separation step at a temperature of about 50° C. The separated aqueous solution of alkali-metal mercaptides may be subjected to an additional purification treatment by adsorption of impurities on active carbon. For this purpose, active carbon is added to the aqueous mercaptide solution in an amount of about 1.5% by weight of the starting resinous material and the mass is stirred for 30–60 minutes.

The purified aqueous solution of aromatic alkali-metal mercaptides is filtered on a Nutsche filter or a filter press and transferred to a reaction vessel, wherein it is treated with an aqueous solution of a heavy metal salt, for example, zinc sulfate of 20–24% $ZnSO_4$ concentration. To avoid the formation of ZnO, the zinc sulfate is introduced in an amount sufficient to obtain a pH of 5.5–6.7 in the reaction medium.

The mixture is stirred intensively. As a result of the reaction of the alkali mercaptides with zinc sulfate, a mixture of water insoluble zinc mercaptides is precipitated from the solution in the form of a white-yellow or grey-white suspension.

The precipitated product after being filtered, washed, dried and ground provides a powder of perfect quality for the acceleration of rubber vulcanization.

DESCRIPTION OF PREFERRED EMBODIMENTS

There will now be described preferred embodiments of the invention, given by way of example only. It is to be understood that the following examples may be varied without departing from the scope and spirit of the invention which is defined by the appended claims.

Example I 250 g. of resinous impurities as defined above were introduced into a glass flask provided with a stirrer, thermometer and reflux condenser. After addition to 100 ml. of a 25% aqueous solution of NaOH and heating the reaction mass to about 70° C., the whole mass was stirred for about 60 minutes. Then 1 liter of water was added to the flask and the reaction medium was heated to 50° C. with continuous stirring, whereafter the mixture was transferred to a settler. After about 20 min. the aqueous upper layer and the resinous lower layer were separated one from another. The aqueous upper layer contained a solution of sodium mercaptides and was transferred to a beaker provided with a stirrer and treated with an aqueous solution of zinc sulfate of 23% ZnSO₄ concentration, while stirring the mixture.

When the pH of reaction medium was 6–6.1, further addition of zinc sulfate was stopped and the reaction mixture was stirred for an additional 5–7 minutes.

Then the contents of the beaker were transferred to a Nutsche filter and after the precipitated product was filtered, washed and dried, the melting point thereof was determined. The product melted at 160°–186° C. The yield of the process was 107–115 g. of accelerator. The content of the product after being incinerated was 21.1–24.1%.

Example II 750 g. of a naphtha solution of resinous impurities obtained in the purification of 2-mercaptobenzothiazole and containing 250 g. of resins were introduced into a glass flask provided with a stirrer, thermometer and reflux condenser.

Then 100 ml. of a 25% aqueous solution of NaOH was added and the reaction mass was heated to about 70° C. and stirred very intensively for about 60 mintues. Thereafter, the process was the same as in Example I. The quality and yield of the product was the same as in Example I.

What is claimed is:

1. A process comprising reacting a resinous waste material by-produced in the formation of 2-mercaptobenzothiazole from aniline, carbon disulfide and sulfur or aniline, nitrobenzene, carbon disulfide and sulfur with an aqueous solution of an alkali-metal hydroxide or ammonium hydroxide to form water soluble alkali-metal or ammonium mercaptides, separating the thusly formed water soluble mercaptides, reacting the thusly separated water soluble mercaptides with zinc sulfate to form water insoluble zinc mercaptides and separating the thusly formed water insoluble zinc mercaptides.

2. A process as claimed in claim 1 wherein the resinous waste material is reacted with an aqueous solution of sodium hydroxide.

3. A process as claimed in claim 1 wherein the zinc sulfate is in aqueous solution.

4. A process as claimed in claim 3 wherein the reacting with zinc sulfate is effected at a pH of 5.5 to 6.7.

5. A process as claimed in claim 1 wherein the resinous waste material and the alkali-metal hydroxide or ammonium hydroxide are reacted at a temperature of about 70° C.

6. A process as claimed in claim 1 wherein the water soluble alkali-metal or ammonium mercaptides are separated at about 50° C.

7. A process as claimed in claim 1 wherein a naphtha solution of the resinous waste material is reacted with the aqueous solution of alkali-metal hydroxide or ammonium hydroxide.

References Cited

UNITED STATES PATENTS

| | | | |
|---|---|---|---|
| 1,453,515 | 5/1923 | Murrill | 260—429.9 |
| 1,631,871 | 6/1927 | Kelly | 260—306 |
| 1,838,159 | 12/1931 | Scott. | |
| 2,001,581 | 5/1935 | Semon et al. | 260—306 |
| 2,090,233 | 8/1937 | Roberts | 260—306 |
| 1,865,477 | 7/1932 | Messer | 260—306 |
| 2,349,598 | 5/1944 | Roberts | 260—306 |
| 2,392,935 | 1/1946 | Mathes | 260—306 |
| 2,631,153 | 3/1953 | Paul et al. | 260—306 |
| 2,730,528 | 1/1956 | Weyker et al. | 260—306 |
| 3,031,073 | 4/1962 | Szlatinay | 260—306 |
| 3,131,196 | 4/1964 | Wood | 260—306 |
| 3,215,716 | 11/1965 | Neuworth et al. | 206—429.9 |
| 2,754,303 | 7/1956 | Narman | 260—299 |
| 3,043,847 | 7/1962 | Wilde | 260—299 |

TOBIAS E. LEVOW, Primary Examiner

H. M. S. SNEED, Assistant Examiner